March 18, 1930.  C. MARIENTHAL  1,751,414
HANDLE GRIP
Filed June 2, 1926
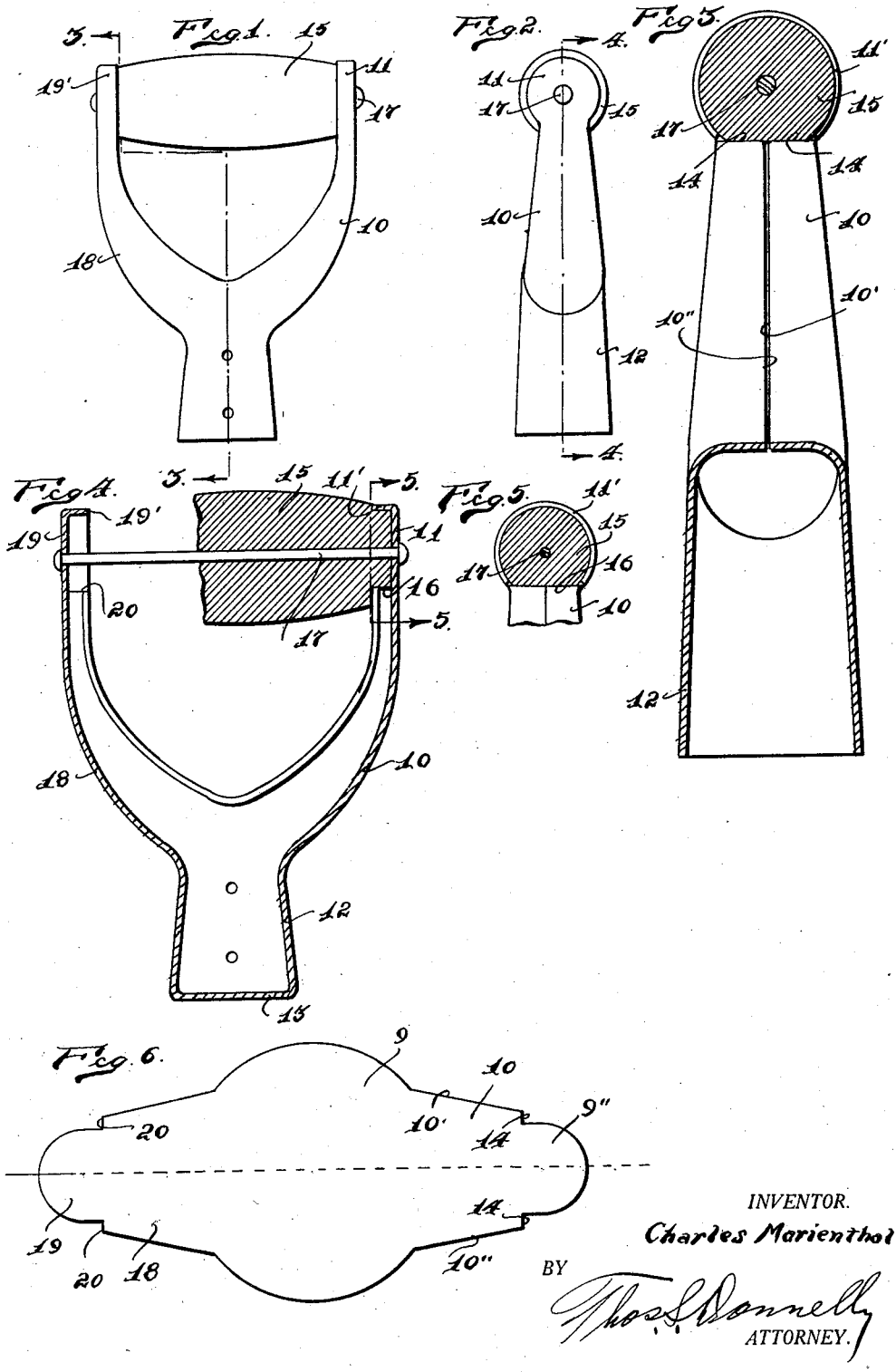
INVENTOR.
Charles Marienthal
BY
Thos. L. Donnelly
ATTORNEY.

Patented Mar. 18, 1930

1,751,414

UNITED STATES PATENT OFFICE

CHARLES MARIENTHAL, OF DETROIT, MICHIGAN, ASSIGNOR TO COLUMBUS HANDLE & TOOL CORPORATION, OF COLUMBUS, INDIANA, A CORPORATION OF INDIANA

HANDLE GRIP

Application filed June 2, 1926. Serial No. 113,118.

My invention relates to a new and useful improvement in a handle grip adapted for mounting on handles of various kinds, such as shovel handles, fork handles and the like, to afford a means for gripping with one hand in the customary manner.

Many hand grips have been fabricated in different ways, such as stamping, casting and the like, but the present invention has, for its object, the provision of a handle grip of this class which may be formed of a stamping in one piece.

Another object of the invention is the provision of a handle grip of this class which will be simply and easily manufactured, economical to construct and durable in use.

Another object of the present invention is the provision of a handle grip of this class which will prevent rotating of the gripping bar when mounted in the handle grip, the gripping bar being centrally mounted.

Another object of the invention is the provision of a handle grip of this class formed yoke-shaped and having the stem of the yoke integral with the arms, so arranged and constructed as to eliminate the necessity of welding or joining together separated parts.

Other objects will appear hereinafter.

The invention consists in the combination and arrangement of parts hereinafter described and claimed.

The invention will be best understood from a reference to the accompanying drawings which form a part of this specification and in which, Fig. 1 is a side elevational view of the invention.

Fig. 2 is an end elevational view of the invention.

Fig. 3 is a sectional view taken on substantially line 3—3 of Fig. 1.

Fig. 4 is a sectional view taken on substantially line 4—4 of Fig. 2.

Fig. 5 is a fragmentary sectional view taken on substantially line 5—5 of Fig. 4.

Fig. 6 is a plan view with the blank used in fabricating the invention.

As shown in the drawings the invention is made preferably from metal and formed from a blank illustrated in Fig. 6. This blank comprises a central or main body portion 9 which is formed as illustrated circular with the outwardly projecting flap 10 at one side, this flap 10 being equally spaced at opposite sides of the diameter of the circular portion 9, this diameter being indicated by the dotted line 9'. Projected diametrically from the opposite side of the main body portion 9 is a flap 18 which is also equally spaced on opposite sides of the diametrical line 9'. Projecting outwardly from the end of the flap 10 is a tongue 11, its outer edge being formed circular, and projecting outwardly from the end of the flap 10, within its margins to provide the shoulders 14. A similar tongue 19 projects outwardly from the end of the flap 18 providing the shoulders 20.

In formation the main body 9 is stamped into a tubular portion 12 which forms the stem of the yoke, this portion 12 being flared toward the base 13 as clearly appears in Fig. 4. In forming this portion 12 the metal is drawn as well as stamped. The flaps 10 and 18 are curved upwardly by the die to form the arms of the yoke, the edges of the flaps 10 and 18 being turned inwardly toward each other so that, as illustrated in Fig. 3 relatively to the flap 10, the edges 10' and 10'' are brought into close relation. The tongue 11 is crimped along its edges to provide the face flange 10'. The tongue 19 is also crimped to provide the face flange 19'. Mounted between the tongues 11 and 19 and embraced by the face flanges 11' and 19' is a hand hold 15 which is preferably made of wood and which is provided adjacent each end with a flat 16 engaging against the shoulders 14 and 20, so that the hand hold 15 is prevented from turning on the pin 17 as an axis, this pin 17 being projected through the tongues 11 and 19 for binding the hand hold 15 in position.

It will be noted that the pin 17 is projected axially through the hand hold 15 so that an eccentric mounting is not required and the base 13 may then be removed from the stem 12 so that the handle used with the device may be inserted into the socket of the stem 12 and riveted or otherwise suitably secured therein.

It is thus seen that I have provided a handle grip which is formed from a stamping and which is made from a single piece of metal.

The operation required for forming the handle grip from a single piece of metal is simple, requiring a minimum amount of labor, so that the device may be economically manufactured. It is also to be noted that none of the parts are welded or soldered together and that, on account of the formation of the arms of the yoke tubular in the manner described and shaped as shown in Fig. 4 and Fig. 1, the device is possessed of a maximum strength while at the same time it is light and so constructed as to be easily and quickly mounted on the handle with which used.

While I have illustrated and described the preferred form of structure I do not wish to limit myself to the precise form of structure shown but desire to avail myself of such variations and modifications as may come within the scope of the appended claims.

Having thus described my invention what I claim as new and desire to secure by Letters Patent is:

1. A handle grip of the class described formed from a single blank comprising a stem; a pair of arms diverging outwardly from said stem, the opposite edges of each of said arms being folded inwardly upon the body portion and spaced therefrom to form said arms tubular; a tongue projecting outwardly from each of said arms; a hand hold having a flat formed thereon; means projected through said hand hold and through said tongues for mounting said hand hold on said tongues, said flat engaging said doubled over edges of said arms for preventing rotation of said hand hold on its mountings.

2. A handle grip of the class described formed from a single blank comprising a stem; a pair of arms diverging outwardly from said stem, the opposite edges of each of said arms being folded inwardly upon the body portion and spaced therefrom to form said arms tubular; a tongue projecting outwardly from each of said arms, a hand hold having a flat formed thereon; means projected through said hand hold and through said tongues for mounting said hand hold on said tongues, said flat engaging said doubled over edges of said arms for preventing rotation of said hand hold on its mountings; and a flange on each of said tongues projecting inwardly from the faces thereof for embracing the periphery of said hand hold adjacent each end.

In testimony whereof I have signed the foregoing.

CHARLES MARIENTHAL.